June 6, 1961 W. MIELZINER ET AL 2,987,621
RADIOACTIVE RADIATION DETECTOR SYSTEM
Filed Feb. 18, 1958 6 Sheets-Sheet 2

INVENTORS
WALTER MIELZINER
WILLIAM M. DeBELL
BY
ATTORNEY

June 6, 1961   W. MIELZINER ET AL   2,987,621
RADIOACTIVE RADIATION DETECTOR SYSTEM
Filed Feb. 18, 1958   6 Sheets-Sheet 6

INVENTORS
WALTER MIELZINER
WILLIAM M. DeBELL
BY
ATTORNEY

United States Patent Office 2,987,621
Patented June 6, 1961

2,987,621
RADIOACTIVE RADIATION DETECTOR SYSTEM
Walter Mielziner and William M. De Bell, Denver, Colo., assignors to The Stanley Aviation Corporation, Aurora, Colo., a corporation of New York
Filed Feb. 18, 1958, Ser. No. 715,984
17 Claims. (Cl. 250—71.5)

This invention relates to a radioactive radiation detector system and, more particularly, to such a system useful as a radioactive miss distance indicator.

Within relatively recent times, projectiles and missiles have been developed which utilize the proximity fuse principle, thus eliminating the necessity for a direct hit to destroy or disable the target. Obviously, with these missiles armed, destruction of the target is an adequate measure of the performance of the missile and the gunners who have fired it. Even with armed missiles, however, a near miss may go undetected, insofar as its effect on the target is concerned; yet, information of this type is quite important in evaluating the performances of both equipment and personnel.

Of greater importance, however, is the aspect of performance evaluation under practice conditions, wherein an unarmed missile or projectile is fired at a target which may conveniently be the radio-controlled pilotless drone, a tow target or a balloon and the like. Here it becomes extremely important to find out how close the missile approached the target, as this information will indicate a hit or a miss even though the target remains intact, due to the characteristics of the particular missile being used. In other words, if it were known that the missile approached within thirty feet of the target and that the missile, when armed, is effective to accomplish destruction of a target within sixty feet thereof, such information provides an accurate performance picture without destroying an expensive and complex target.

The foregoing problem, while easy to recognize, has been found to be extremely difficult to solve in a practical, effective and inexpensive manner. The prime difficulty is, of course, the tremendous relative speeds between the missile and target, usually at high altitudes, which renders any direct visual or photographic system completely useless. Other important difficulties are those of weight and expense.

The prior art attempts at the design of a miss distance indicating system have taken several approaches, including photo and electronic triangulation optical systems, acoustical systems and systems based upon the radar doppler principle. The photo and electronic triangulation optical systems are quite complex and have been found too involved, expensive and ineffective for use in practical ground-to-air or air-to-air miss distance applications.

The systems employing the acoustical principle sense miss distance by measuring the peak pressure of the shock wave generated by a projectile in flight at supersonic velocities. The peak amplitude of shock waves for a given projectile are essentially dependent only on the propagation distances of velocities greater than Mach 1.5. Acoustical systems cease to function properly when the velocity of the target exceeds that of the velocity of sound and practical limits of operation are reached well below the transonic range. Acoustical systems have many limitations because of the non-uniformity of the shock waves generated by odd-shaped targets and because of variations of pressure wave attenuations with atmospheric conditions.

Other systems use the radar doppler effect in one form or another. These systems require equipment in the missile, the target drone, and an appreciable amount of remotely located receiving and data reduction equipment. The radar doppler systems require equipment in the drone which is excessive in weight, size, cost and electrical power requirements. In addition, complex data techniques are required.

It is, therefore, a principal object of the present invention to provide a radiation detection system which will accurately detect, measure and indicate rapidly changing radiation levels.

It is a further important object of the invention to provide a radically new and relatively simple approach to the performance and operational requirements of miss distance indication with airborne targets. The invention utilizes the omnidirectional radiation characteristics of radioactive isotopes and its operation is based on the variation in radioactive radiation intensity with distance from the radiation source.

A further important object of the invention is to provide a radioactive miss distance indicator system to include a source of radioactive radiation, and detection and data reduction equipment and including, in certain instances, telemetering equipment and remotely stationed receiving and date reduction equipment.

Another object of the invention is the provision of novel radiation detection and data reduction equipment comprising a scintillation-type detector, data reduction circuits and associated power supplies.

Another important object of the invention is to provide novel data reduction equipment designed to receive information from the detection equipment in the form of pulses, with the number of pulses received during a predetermined interval of time being proportional to the radiation intensity, which will vary according to the distance separating a radioactive source and the detection equipment, and translate this information into data useful for indicating the presence of a missile, carrying a radioactive source, within the critical destruction distance of a target carrying the detection equipment.

Another important object of the invention is to provide novel data reduction equipment designed to automatically compensate for the presence of, and variations in, background radiation intensity.

It is a further important object of the invention to provide novel data reduction equipment which will provide a qualitative indication of a hit or no hit, and in addition is adapted to provide a quantitive indication of the distance between the radioactive source and detector as the source passes through the detection zone of the detector.

Further objects of the invention are to provide a radioactive miss distance indicator that is relatively simple, compact, lightweight and accurate.

Other objects will be in part apparent and in part pointed out specifically hereinafter in connection with the description of the drawing that follows, wherein for convenience and brevity the usual and conventional sources of current for cathode heaters in the amplifying tubes and other conventional circuit components have been omitted from the drawing; and, in which.

FIGURES 3, 4, 5 and 6 collectively illustrate the complete circuit diagram, in schematic form, of a preferred embodiment of the invention.

In accordance with the invention, the miss distance indicator system for detecting the proximity of a missile to a target comprises a source of gamma radiations of known activity, detection means for developing electrical pulses from applied gamma radiations, such pulses varying in frequency proportional to the intensity of the applied gamma radiations, means for deriving from these pulses a control signal which varies in amplitude in accordance with the number of pulses detected during a predetermined sampling period and means responsive to the control signal to indicate the presence of the radioactive source within a predetermined distance from the detector. The reduction system indication of a hit may be by means of a flare or other visual signal or the transmission of a signal over a radio link or other suitable means.

Figure 1:
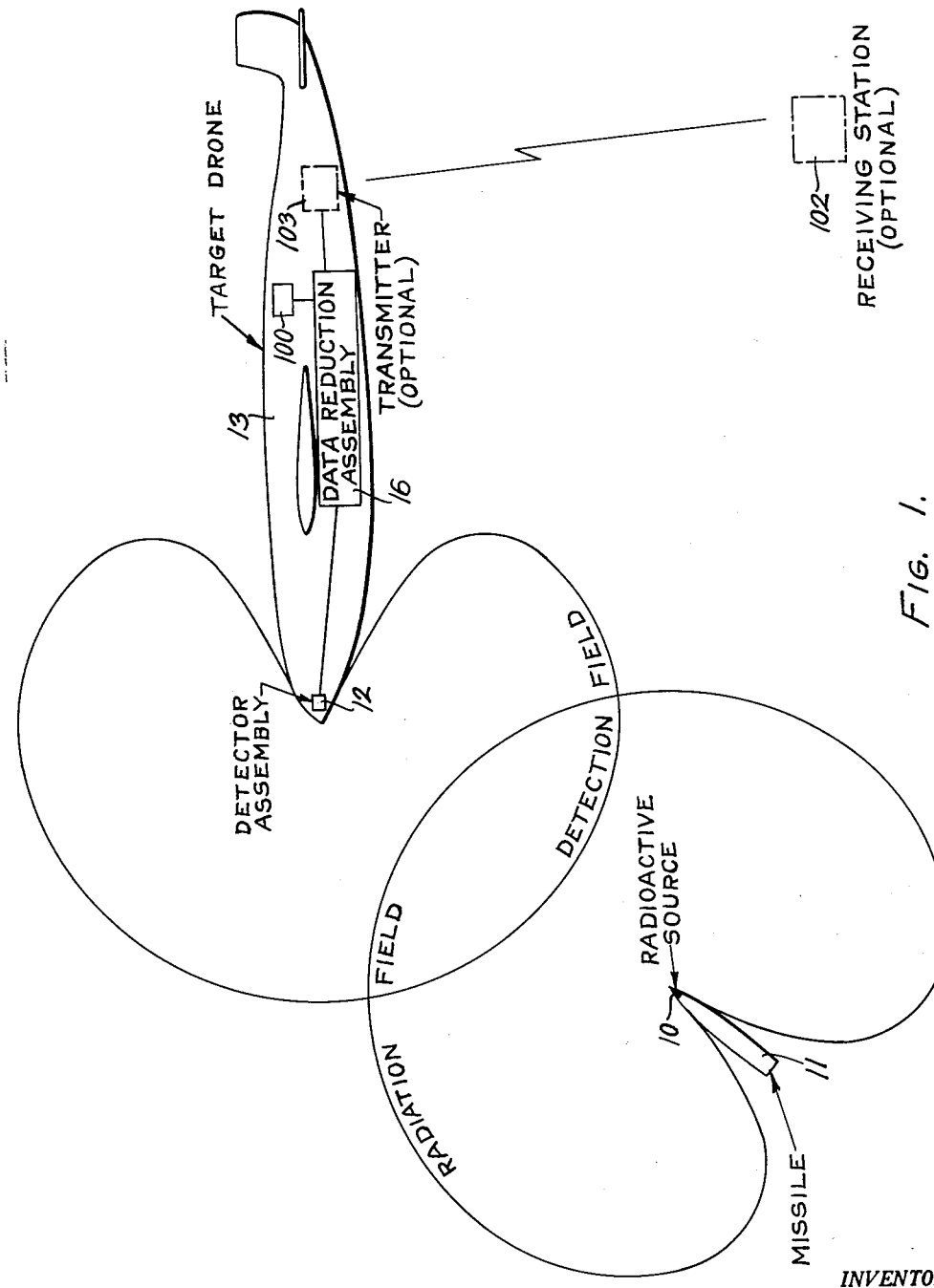
FIGURE 1 is a block diagram which illustrates a preferred embodiment of the invention including a missile carrying a radioactive source, a detector and associated data reduction system.

Referring now to FIGURE 1, a radioactive source providing hard gamma ray emissions of an isotopic character is generally indicated by reference numeral 10. The radioactive gamma source is preferably housed on the nose of missile 11 in a manner to provide a uniform and nearly spherical radiation field. Cobalt 60 has been found quite effective as a source of gamma ray photons, although it is to be understood that other radioactive gamma sources could also be used. Selection of the particular activity of the source of gamma ray emissions depends on the detector sensitivity, scoring distance and desired accuracy; however, a nominal value of activity would be in the range of about 100 millicuries for a 30 ft. scoring distance using a 3 inch detection crystal.

The intensity of the gamma ray radiation from the radioactive source, housed in the missile, varies inversely with the square of the distance therefrom and it is this basic principle upon which operation and construction of the miss distance indicator of the present invention is based. Radiation intensities are measured in rates, usually expressed in Roentgens per hour; therefore, a study of the radiation measurement is primarily a study of rate measurement, or counting rate measurement. The radiation intensity (and hence count rate) changes rapidly with time for fast rates of closure of the missile and target. This requires that the data pulses be counted or sampled over a short interval of time and an average counting rate or intensity level calculated therefrom. The number of counts received during that short time interval should be as large as possible to reduce statistical variations. Accordingly, the instrument which is used to measure the radiation intensity at the target must be one that provides the highest number of counts per time interval for a given radiation intensity. The radiation measuring instrument with the greatest counting rate and, therefore, the highest sensitivity is a scintillation-type counter.

A scintillation-type detector 12 is located in the forwardmost portion of drone 13 to provide a uniform and nearly spherical detection field. Signals from the detector 12 are fed to a data reduction assembly 16 in the drone, which develops an output indicating the proximity of source 10 in missile 11 to detector 12 contained in drone 13. While the present disclosure has references to placement of the radioactive source in a missile and the detector and data reduction assembly in a target, it will be readily appreciated that the positioning can be reversed without detracting from the basic invention.

Figure 2:
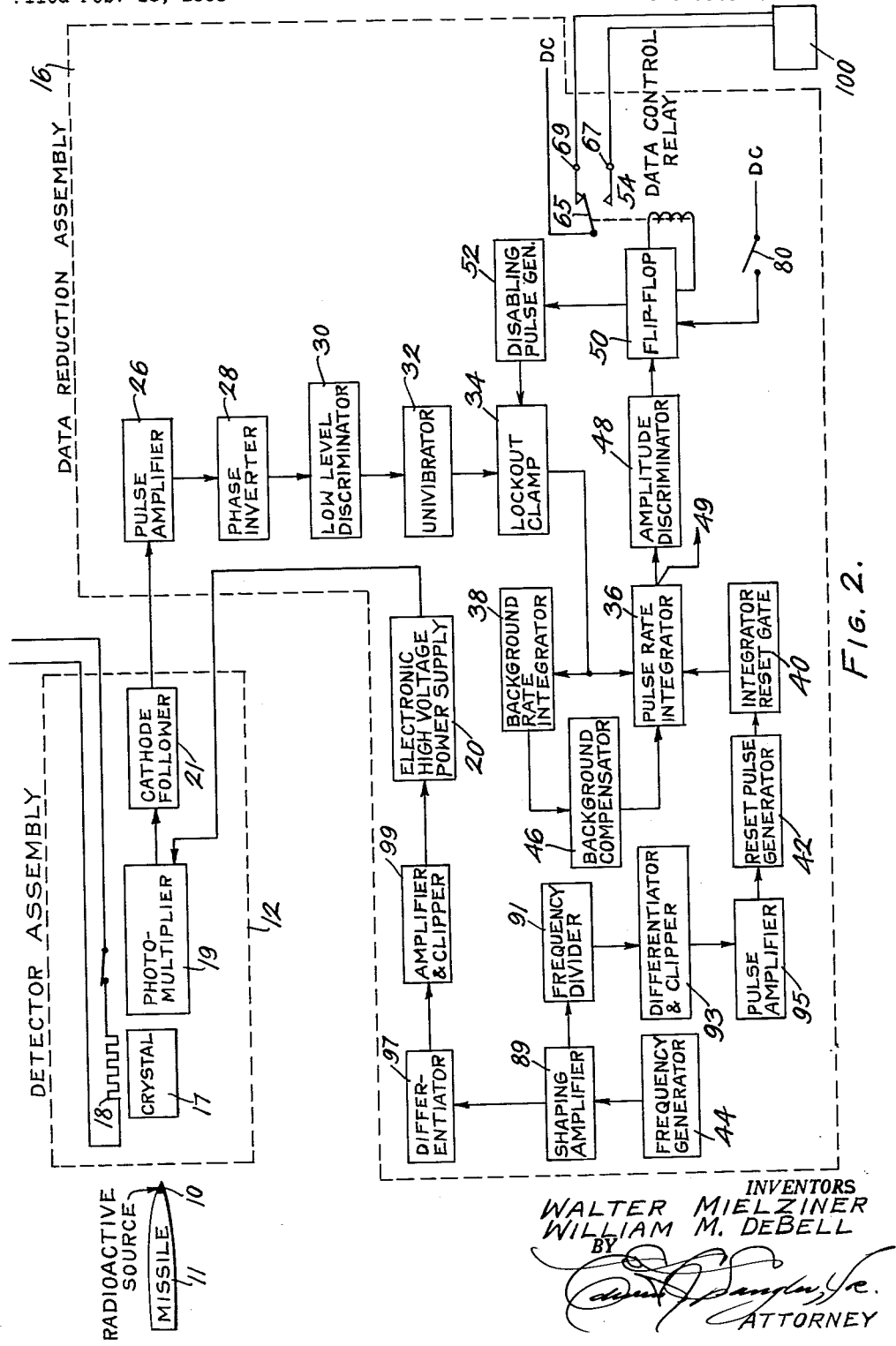
FIGURE 2 is a complete block diagram of a preferred embodiment of the invention illustrating the functional parts of the detector and data reduction system.

With reference to FIGURE 2, the detector, indicated in a general way by numeral 12, will be seen to comprise basically a crystal 17, a heater 18 for the crystal, a conventional photo-multiplier tube 19 arranged to receive and amplify the energy of the gamma rays striking the crystal and converted therein to light photons, a cathode follower 21 connected to the photo-multiplier as a one-stage amplifier, providing a high input impedance and a low output impedance which is used to obtain the required impedance step down over wide frequency ranges.

The crystal 17 is preferably thallium activated sodium iodide NaI (Tl) which is presently recognized as the most efficient material known for scintillation crystals due primarily to its high density and transparency. A sodium iodide crystal must, however, be maintained in a dry atmosphere and hermetically sealed for use because of its highly hygroscopic property. The crystal preferably provides a counting rate in the range of 30,000 counts per second in a 1.0 mr. per hr. gamma radiation field. It has been found that a 3″ dia. x 3″ crystal will approximately provide the foregoing counting rate.

The data reduction assembly is seen to comprise a pulse amplifier 26 to amplify the received signals, a phase inverter 28, a low level discriminator 30 and univibrator 32 producing uniformly shaped pulses, which are applied through a lockout clamp 34 to a pulse rate integrator 36 and to a background rate integrator 38 respectively. Pulse rate integrator 36 is adapted to integrate pulses received from the univibrator 32 during a predetermined sampling period. An integrator reset gate 40 is adapted to reset the pulse rate integrator 36 at a recurrent rate in response to pulses from reset pulse generator 42 under the control of a standard frequency source 44. Background compensator circuit 46 is adapted to compensate the output of pulse rate integrator 36 proportional to the average background rate as measured by the background rate integrator 38. Amplitude discriminator 48 is adapted to produce an output in response to integrated signals from pulse rate integrator 36, when a predetermined minimum amplitude is exceeded. Flip flop 50 is responsive to the output of amplitude discriminator 48 and changeable from one stable condition to another. Disabling pulse generator 52 is responsive to a change of state of flip flop 50 and is adapted to generate and apply a disabling pulse of a predetermined duration to lockout clamp 34 to remove pulses from inputs of integrators 36 and 38 such that the system will be temporarily disabled for the duration of the generated disabling pulse and thus prevent more than one hit being indicated per missile. Data control relay 54 is responsive to a change of state in flip flop 50 to close an electrical circuit and give an indication of a hit being registered.

Figure 3:
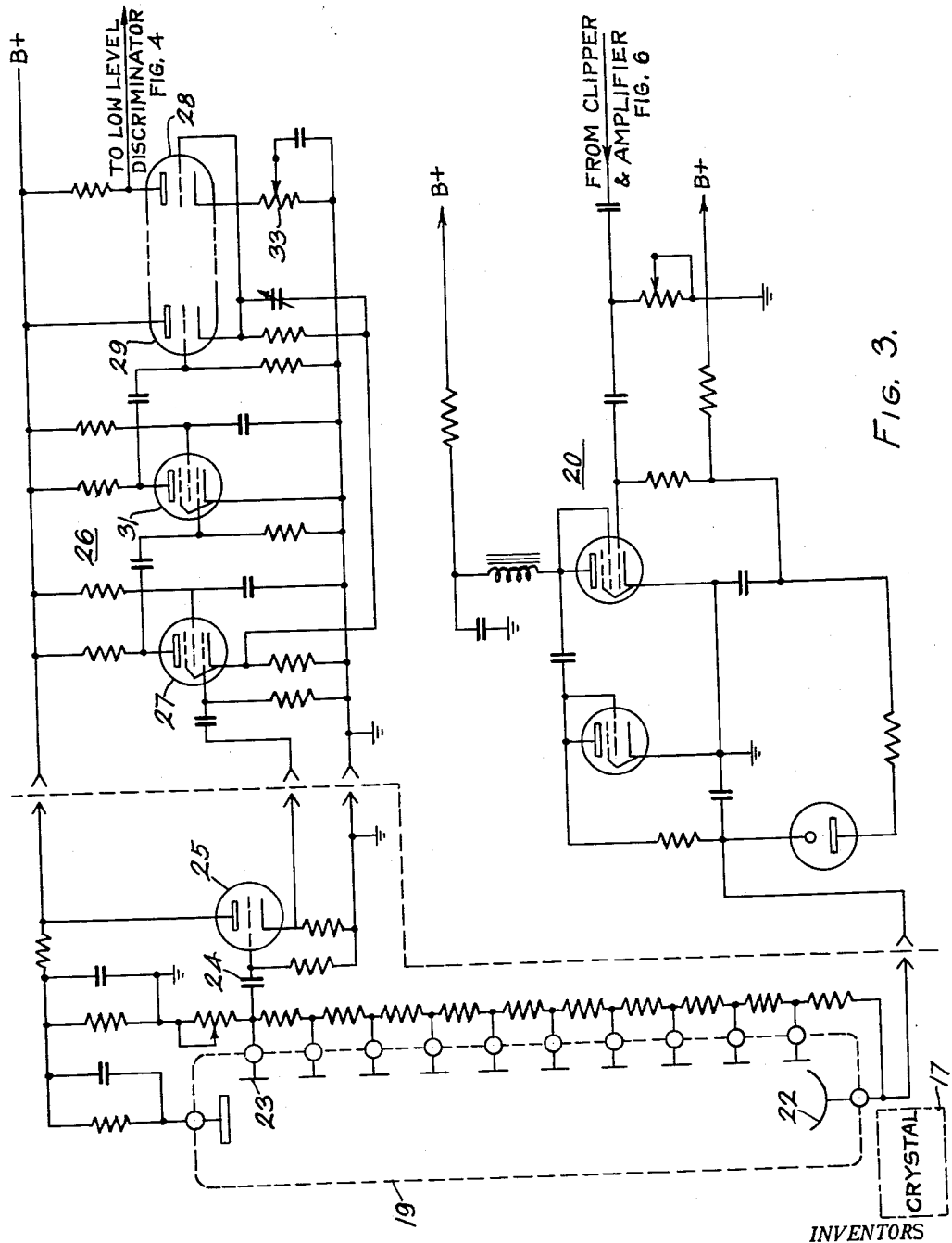

Referring to FIGURE 3, light photons emitted by the crystal 17, in response to radioactive photons striking same, impinge upon the cathode 22 of the photo-multiplier 19, which causes electrons to be emitted therefrom in proportion to the photon input. The electrons, emitted from the cathode 22, are amplified through successive higher potential stages by secondary emission and produce a highly amplified signal at output dynode 23. The amplified signal is fed serially through blocking condenser 24 to the control grid of triode 25 that forms the cathode follower 21 of FIGURE 2. These signals are then fed to amplifier 26 which comprises a pentode 27, a pentode 31 with the control grid thereof connected serially through a blocking condenser to the plate of pentode 27, and a first half 29 of a duotriode having its control grid serially connected througha blocking condenser to the plate of pentode 31. A feedback loop is provided from the cathode of triode 29 to the cathode of pentode 27 to provide for linear amplification. The cathode of triode 29 is further connected to the control grid of triode 28 which functions as a phase inverter. Negative pulses from the pulse amplifier 26, phase inverter 28 included therein, are fed to discriminator 30, FIGURE 4. The gain of phase inverter 28 is adjustable by means of potentiometer 33 to set a low level pulse height threshold and establish the lower limit of energy discrimination.

Figure 4:
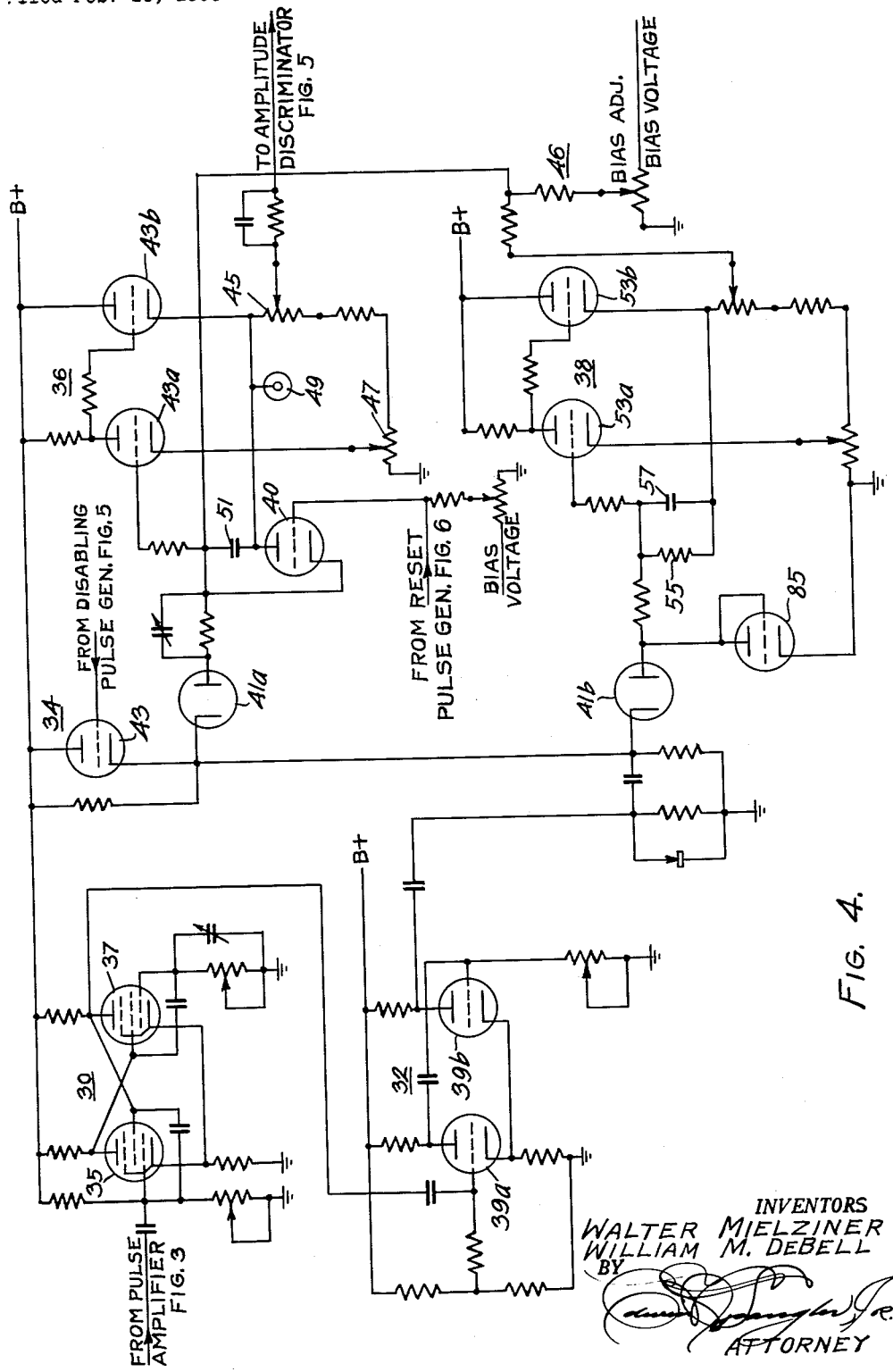

Referring now to FIGURE 4, low level discriminator 30 is a cathode-coupled one-shot multivibrator comprising a pair of pentodes 35 and 37 connected at their cathodes. The plates of pentodes 35 and 37 are cross coupled to a grid of pentode 37 and 35 respectively. The design parameters of this circuit are chosen such that when a negative pulse is applied to the control grid of pentode 35 of an amplitude greater than a predetermined reference level, a negative signal approximating a square wave will appear at the plate of pentode 37 for each such negative pulse so applied.

The output from the plate of pentode 37 of low level discriminator 30 is fed to a pulse shaping univibrator 32 which may conveniently be a cathode-coupled one shot multivibrator comprising a duo-triode 39 having a first triode 39a with its plate serially connected to the control grid of a second triode 39b through a blocking condenser. The design parameters of this circuit are chosen such that when a negative pulse is applied to the control grid of triode 39a, a negative signal, approximating a square wave, will appear at the plate of triode 39b for each such negative pulse applied.

The output signals from triode 39b of univibrator are applied to the cathodes of duo-diode 41a and 41b and also to the cathode of lock-out clamp 43, the function of which is to be described presently. A signal appearing on the anode of diode 41a is applied to the pulse rate integrator 36 which comprises a duotriode 43 including triodes 43a and 43b connected as a D.-C. amplifier with the plate of triode 43a being resistance coupled to the control grid of triode 43b. A feed-back loop is provided from the cathode of 43b to the cathode of 43a serially through potentiometer 45 and 47, the latter of which has one end at ground potential and the sliding tap thereof connected to the cathode of triode 43a. Capacitive coupling is provided between the control grid of triode 43a and the cathode of triode 43b. The resulting circuit is that of an integrating amplifier. The output pulses from diode 41a, on being applied to the control grid of triode 43a, causes an integration of these signals to appear on the sliding tap of potentiometer 45 and also at optional output 49 for the purpose to be explained. The pulse rate integrator 36 produces an output signal which increases in amplitude with time at a rate proportional to the count rate. The output signal of the pulse rate integrator is reset to zero level on application of a reset pulse derived from the integrator reset gate 40 and reset pulse generator 42. Immediately prior to the application of the reset pulse, the amplitude of the integrator output signal is proportional to the average count rate. Integrator reset gate 40 is comprised of a triode having the cathode thereof resistance-coupled to the control grid of triode 43a of pulse rate integrator 36 and the plate thereof connected to integrating capacitor 51. The control grid of reset gate 40 is connected to the output of pulse reset generator 42, to be described.

Figure 5:
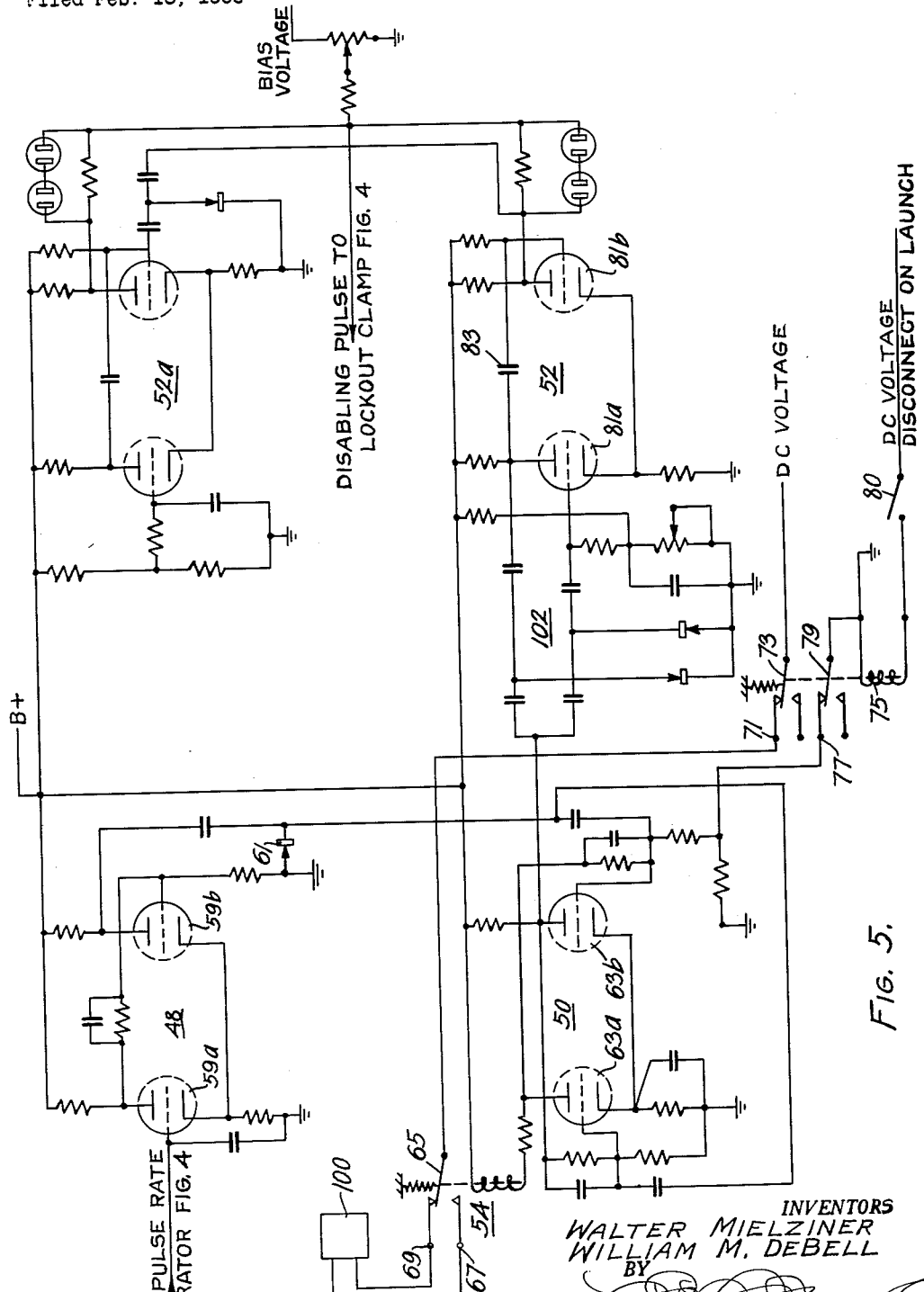

Pulses are continuously applied to the control grid of reset gate 40 from reset pulse generator 42, FIGURE 5, at predetermined intervals of time. These pulses are of an amplitude sufficient to bias gate 40 to a conducting state and discharge condenser 51, thus removing the voltage integral of pulses supplied by low level discriminator 30 to the input of pulse rate integrator 36 at preselected intervals corresponding to the sampling period. Thus it is seen that pulses from the low level discriminator will be integrated for the period of time between reset pulses from reset pulse generator 42 and appear at the sliding tap of the potentiometer 45 in the cathode circuit of triode 43b. The amplitude of the integrated signals may be adjusted by means of potentiometer 45 for calibrating purposes. The linearity of the integrator circuit may be adjusted by potentiometer 47.

In order to obtain an accurate account of pulses resulting from the radiation source 10 it becomes necessary to correct for any pulses, known to be due to background radiation, which may emanate from cosmic rays and the like. Usually the intensity of any background pulses is fairly low compared with the intensity of the radiation source, in terms of the number of counts per unit of time. Pulses resulting from background radiation as well as from the radiation source will be applied to the pulse rate integrator. To correct for the background, a signal equivalent to the average background is effectively subtracted from the signals applied to pulse rate integrator 36. This is accomplished in the following manner. Pulses from univibrator 32 appear on the anode of diode 41b and are applied to the control grid of the first triode 53a of duo-triode 53 of the background rate integrator 38. An RC charging circuit comprised of resistor 55 and condenser 57 is connected between the grid of 53a and the cathode of 53b. The component values of condenser 57 and resistor 55 are chosen to provide a time constant of a duration several times that of the interval during which the radiation source to be detected will be within a detectable range of the detector. A charge appearing across condenser 57 will be substantially only the long term integration of background radiation, as any charge produced by the detectable presence of the radiation source will be of such short duration when compared with the time constant of the RC charging circuit that the additive effect is insignificant. The charge on condenser 57 appears at the output of background rate integrator as a positive D.C. potential equivalent to the average count rate produced by background radiation. This positive output is applied to the input of pulse rate integrator 36 through background compensator 46 canceling that component of negative going signals applied to low level discriminator 30 resulting from background radiation.

The sliding tap of potentiometer 45 is resistance coupled to amplitude discriminator 48, FIGURE 5, which comprises a duo-triode including triode 59a and 59b connected as a Schmit-Trigger circuit. The plate of triode 59a is connected to the control grid of triode 59b serially through a resistance having a capacitance in shunt. The plate of triode 59b is connected serially through a capacitance to the cathode of a diode 61, whose anode is connected to ground potential. When the integrated pulses from pulse rate integrator 36 are applied to amplitude discriminator 48, those signals of an amplitude equal to or greater than that required to trigger the amplitude discriminator cause a single square pulse to appear on the plate of triode 59b. This wave is differentiated and clipped by diode 61 in such a manner as to pass only the leading edge of the square wave. Signals from the pulse rate integrator 36 which do not have an amplitude equal to or greater than that required to trigger amplitude discriminator 48 are discriminated against and do not produce an output.

The output of amplitude discriminator 48 is capacity coupled to the control grids of flip-flop 50 which is a duo-triode 63 connected as a cathode-coupled bistable multivibrator in which one triode is normally conducting and includes triodes 63a and 63b. The plate load of triode 63a includes the actuating coil of data control relay 54. When a peaked pulse from amplitude discriminator 48 is applied to the control grid of triodes 63a and 63b, the triode which is cut off begins to conduct and the other triode is cut off. With triode 63a conducting, the actuating coil is energized attracting armature 65 to close contact 67 and open contact 69. When triode 63b is conducting, relay contact 69 will be closed and relay contact 67 will be opened. Armature 65 of data control relay 54 is connected to a voltage source serially through contact 71 and armature 73 of power control relay 75 after launching. The control grid of triode 63b of flip-flop 50 is connected serially through a resistance to ground through contact 77 and armature 79 of power control relay 75. Data control relay contacts 67 and 69 respectively comprise the outputs of the miss distance indicator and the alternate closing of these contacts by armature 65 and the application thereto of a voltage serves to indicate a hit. A suitable indicator 100 may be connected to contacts 67 and 69 to indicate when a hit is scored. This indicator may assume any one of many forms as well understood in the art, e.g. pyrotechnic flares, telemetering transmitters and associated circuitry necessary to operate same, or any other means that will provide some physical manifestation of a hit being scored.

Power control relay 75 prior to launching of the target carrying the detector and associated computer components is activated by a voltage applied to its actuating coil through switch 80, opening contact 71, removing the voltage from armature 65 of data control relay 54. Contact 77 is opened on closing switch 80 removing same from ground potential to reset flip-flop 50 to the reset position or state. On launching of the target, switch 80 is opened allowing contacts 71 and 77 to close with armatures 73 and 79 of power control relay 75, applying a voltage to the armature 65 of data control relay 54 and connecting contact 77 to ground permitting flip-flop 50 to change state in response to incoming signals from amplitude discriminator 48.

The plate of triode 63b of flip-flop 50 is connected through a differentiating and clipping network 102 to the control grids of disabling pulse generator 52 which comprises a cathode-coupled duo-triode 81 including triodes 81a and 81b connected as a one-shot univibrator which when triggered produces an output pulse of a duration proportional to the time constant of the circuit. When flip-flop 50 changes state, as by the application of a positive pulse to its control grids, the pulse appearing on the anode thereof is passed by the aforementioned differentiating and clipping network and applied as a peaked pulse to the control grids of triodes 81a and 81b. This pulse produces a pulse to appear on the plate of triode 81b of a duration proportional to the value of the capacitor 83 connected between the anode of triode 81a and the control grid of triode 81b. The output of the disabling pulse generator 52 is resistance coupled to the control grid of lockout clamp 34, FIGURE 4. A pulse from disabling generator 52 is applied to the lockout clamp 34 after each hit is registered causing the lockout clamp to conduct, clamping out the signals from low level discriminator 30 and preventing them from reaching the pulse rate integrator 36 and background rate integrator 38 for the duration of the disabling pulse. When lockout clamp 34 is activated, a fairly heavy current is drawn through the load resistor connected to the cathodes of diodes 41a and 41b. To prevent this current from discharging the charging circuit 55 and 57 of the background rate integrator 38 each time a disabling pulse is generated, diode 85 is provided in shunt between the anode of diode 41b and ground potential to maintain a static current in the input circuit of the background rate integrator thus offsetting any effect of the lockout function on the long term, background rate integration. Where there is likelihood of one hit being registered and a second missile entering the detection range immediately following the disabling pulse, the disabling pulse generator may not have sufficient time to recover and generate a second disabling pulse. To avoid this condition a second disabling pulse generator 52a may be provided, adapted to be triggered to produce a disabling pulse during the recovery period of generator 52.

Figure 6:
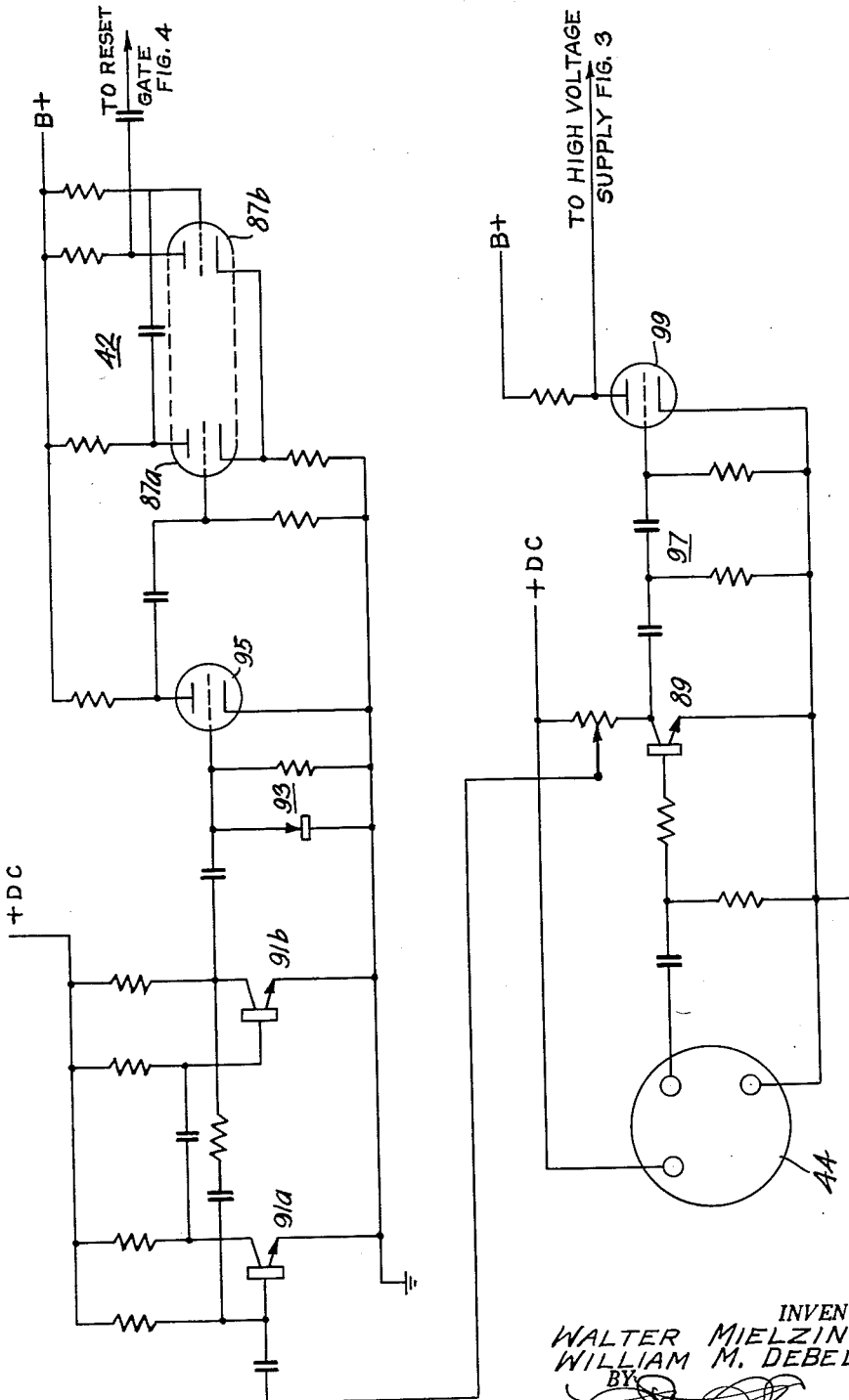

The reset pulse generator 42, FIGURE 6, comprises a duo-triode 87 including triode 87a and 87b connected as a cathode-coupled univibrator. The control grid of triode 87a is driven by a signal from a standard frequency source 44, through a shaping amplifier 89, frequency divider 91a and 91b, differentiator and clipper 93, and pulse amplifier 95. The peaked pulses from amplifier 95 occur at intervals corresponding to a divided frequency of the standard. The application of these trigger pulses to the control grid of triode 87a produces a short duration, square reset pulse to appear on the plate of triode 87b and these pulses occur at regular intervals as determined by the frequency of arrival of trigger pulses to the control grid of triode 87a. The reset signals are applied to the control grid of integrator reset gate 40, FIGURE 4, and control the resetting of pulse rate integrator 36 at the end of each sampling period. Peaked pulses from shaping amplifier 89 are further supplied through a differentiator 97 and amplifier and clipper 99 as a trigger to high voltage supply 20, FIGURE 3. A high, negative voltage, developed by the high voltage supply 20, is applied to electrode 22 and through a voltage divider network to accelerating anodes of photo multiplier tube 19.

Method of operation

With a source of radioactive gamma photons of a given activity, it is possible to detect and determine the average number of particles received from such source at a given distance from the source over a sampling period of predetermined duration; and the number of counts or intensity is a function of the distance. Conversely, it is possible to determine the proximity of said source to a detector, by ascertaining the average count over a sampling period of like duration. It is upon these basic principles that the disclosed embodiment is based.

The system is comprised of a source of gamma radiations 10, a detector 12 which will sense the gamma radiation from the source and convert it into electrical pulses, the number of which is proportional to the radiation intensity and a data reduction system 16 which will act on the output data of the detector to produce the required hit indication.

Referring again to FIGURE 1, a source of gamma radiation 10 may be suitably located on a missile 11. A detector assembly 12 may be suitably located in a target which may be a drone, balloon, tow target or the like. When gamma radiation from source 10 strikes crystal 17, FIGURE 2, light photons are emitted and impinge on the light sensitive element of photo-multiplier tube 19 releasing electrons which are amplified and appear as electrical signals, on the output thereof, the frequency of occurrence being proportional to the intensity of the radiation. These signals are fed to a pulse amplifier 26 and phase inverter 28. The electrical signals are amplified and appear at the output of the phase inverter as negative going pulses. These signals are fed to a low level discriminator 30 which discriminates against signals of an amplitude below a set minimum level suspected of being caused by random low energy level background radiation and noise. Each signal applied to the input of the discriminator, above this minimum amplitude, produces a square wave pulse of negative polarity at the output thereof.

The output is further shaped in univibrator 32 and fed in shunt with lockout clamp 34 to the input of pulse rate integrator 36 and background rate integrator 38 through diodes 41a and 41b respectively. The pulse rate integrator 36 integrates these pulses and produces an integrated positive going output equivalent to the total of pulses received during predetermined time interval, known as the sampling period. The sampling period is determined by the time interval between pulses applied to the integrator reset gate 40 from reset pulse generator 42, according to a time standard. When a reset pulse is applied to the integrator reset gate 40, at a predetermined recurrent rate, the charging circuit of the pulse rate integrator 36 is discharged and a new integration cycle starts. In the instant case it has been found convenient to use a 10 millisecond sampling period, thus pulses from reset pulse generator 42 occur at 10 millisecond intervals. It is to be understood that the length of the sampling period can be varied as desired.

Since background radiation intensity varies from location to location and with altitude, and the low level discriminator is designed to reject pulses below a predetermined minimum height, it is desirable to provide correction for pulses reaching the pulse rate integrator 36 which are above the minimum height and due to background radiation only. Background rate integrator 38 incorporates a charging circuit 55, 57, having a relatively long time constant as compared to the sampling period. This time constant is chosen to be of such duration that the interval of time the radiation source 10 will be within the detectable range of detector 12 is insufficient for the radiation received therefrom to have any significant effect on the output of background rate integrator 38. Thus the output from integrator 38 will be representative of the long term integration of pulses due to the background radiation alone. This positive going relatively steady state D.C. output voltage is applied through the background rate compensator 46 to the control grid of triode 43a of pulse rate integrator 36, effectively subtracting that portion of the negative going pulses, received from the low level discriminator 30, due to average background radiation.

The output of pulse rate integrator 36 is fed to amplitude discriminator 48 which produces an output signal only when the amplitude of the integrated pulses over a sampling period of a duration equal to the interval between reset signals, is equal to or greater than that which is produced by the gamma radiations from source 10 when situated within a distance equal to or less than the scoring distance of the missile from detector 12. When an integrated signal of an amplitude equal to or greater than the aforementioned is fed to amplitude discriminator 48, an output signal is produced thereby which, after shaping, is fed to and actuates flip-flop 50 from a first stable position, which may conveniently be the reset position, to a second stable position, activating or deactivating data control relay 54 and a hit is registered by indicator 100. When flip-flop 50 is activated, a signal developed thereby is fed to disabling pulse generator 52 which develops a disabling pulse of predetermined duration to give the missile time to clear the detection area after a hit has been registered. When flip-flop 50 is activated indicating a hit, the aforementioned disabling pulse is applied to lockout clamp 34, which clamps out any incoming signals to pulse rate integrator 36 preventing further integration for a time sufficient for data control relay 54 to respond to the action of flip-flop and register the hit. It will be readily appreciated that the output of pulse rate integrator 36 available at auxiliary output 49 may conveniently provide a quantitative data which indicates the closing path of missiles with respect to the target. This data may be continuously telemetered to a ground receiving station 102 for analysis, by means of a transmitter 103 located in the target and fed by output 49. This data as received may be displayed on an oscillograph for visual inspection and recorded as a permanent record of the closing paths.

In the embodiment disclosed, a missile carrying a radioactive source approaching a target carrying the detector will cause a hit to be registered when the missile has approached within 30 plus or minus 3 feet of the target, which in this instance is defined as the critical destruction distance. It must be appreciated that this distance will vary according to the destruction range of the missile. The miss distance indicator system of this invention may be used to detect a radioactive gamma source at a greater or lesser distance dependent upon the activity of the source and by increasing or decreasing the sensitivity of the detector and/or data reduction circuitry.

Although the above described embodiment discloses the invention as applied to the detection of a missile, it is to be understood that the invention may be employed in connection with the detection of the presence of any radioactive gamma source within the detection range regardless of its form or carrying vehicle. For example, the system will find utility in any situation where it is desired to accurately detect, measure and indicate rapid changes in radiation levels.

While there has been described what at present is considered to be the preferred embodiment of this invention it will be obvious to those skilled in the art that various changes and modifications can be made therein without departing from the invention. It is aimed, therefore, in the appended claims to cover all such changes and modifications which fall within the true scope of the invention.

What is claimed is:

1. A radiation detection system adapted to accurately detect, measure and indicate rapidly changing radiation levels comprising: radioactive detection means adapted to develop an electrical signal in response to each applied radioactive radiation particle; and integrator means adapted to derive a control signal from said developed signals, proportional to the intensity of the applied radioactive radiations received by said detector means during a sampling period of predetermined relatively short, discrete time interval which is indicative of the intensity of the radiation applied to said detection means during the time interval of the sampling period.

2. A radiation detection system as set forth in claim 1, including discriminator means adapted to selectively discriminate against signals developed by said detection means below a predetermined energy level; means for feeding said developed signals to said discriminator means; said integrator means, having an input and output, being adapted to produce an output signal equivalent to the sum of said developed signals applied to the input thereof from said discriminator means during a sampling period; means for applying the output of said discriminator means to the input of said integrator means and means for deriving a control signal from the output of said integrator means which varies in amplitude in accordance with the intensity of radioactive radiations received by the detector means during a sampling period of predetermined duration.

3. A radiation detection system as set forth in claim 1, including discriminator means having an input and an output circuit adapted to selectively discriminate against signals developed by applied radiations below a predetermined energy level; means for feeding said developed signals to said discriminator means; means for developing reset pulses of predetermined recurrent rate; said integrator means, having an input and output, being adapted to produce an output signal equivalent to the sum of said developed signals applied to the input thereof from said discriminator means during a sampling period; means for individually applying the discriminator output and reset pulses to the input of said integrator means and means for deriving a control signal from the output of said integrator, the amplitude of which varies in accordance with the intensity of applied radioactive radiations received by the detection means during each sampling period occurring between reset pulses.

4. A radiation detection system in accordance with claim 3 including: means responsive to the amplitude of said control signal to indicate the intensity level of applied radiations and disabling means operative to disable the detection system for a predetermined time interval after the intensity level has been indicated.

5. In a miss distance indicator for detecting the proximity of a missile to a target, radiation detection means adapted to develop an electrical signal in response to each applied radioactive radiation particle; integrator means for deriving from said developed signals a control signal which varies in accordance with the intensity of the applied radioactive radiations received by said detector means during a sampling period of predetermined relatively short, discrete duration and means responsive to said developed control signal to indicate the presence of a radioactive source within a predetermined maximum distance from said detector means.

6. In a miss distance indicator for detecting the proximity of a missile to a target, detection means adapted to develop electrical signals in response to applied radioactive radiations in accordance with the intensity thereof; means for developing reset pulses of predetermined relatively short, discrete recurrent rate; integrator means having an input and output circuit; means for individually applying said developed signals and said reset pulses to said integrator input, and means for deriving from the output circuit of said integrator a control signal which varies in accordance with the intensity of the applied radioactive radiations received by the detector during each sampling period occurring between reset pulses.

7. In a miss distance indicator for detecting the proximity of a missile to a target, detection means adapted to develop electrical signals in response to applied radioactive radiations in accordance with the intensity thereof; discriminator means having an input and output circuit, for selectively discriminating against signals developed by radiations below a predetermined energy level; means for applying said developed signals to the input of said discriminator means; means for developing reset pulses of predetermined relatively short, discrete recurrent rate; integrator means having an input and output circuit, for deriving signals in response to the output of said discriminating means; means for individually applying the discriminator output and said reset pulses to said integrator means, and means for deriving from the output circuit of said integrator means a control signal the amplitude of which varies in accordance with the intensity of the applied radioactive radiations received by the detector means during each sampling period occurring between reset pulses.

8. A miss distance indicator system for detecting the proximity of a missile to a target comprising: a source of radioactive radiations of known activity, radiations detection means adapted to develop an electrical signal in response to each applied radioactive radiation particle; integrator means for deriving a control signal from said developed signals proportional to the intensity of the applied radioactive radiations received by said detector means during a sampling period of predetermined relatively short, discrete time interval and means responsive to said developed control signal to indicate the proximity of said radioactive source to said detector means.

9. A miss distance indicator system as set forth in claim 8 including discriminator means adapted to selectively discriminate against signals developed by said detection means below a predetermined energy level; means for feeding said developed signals to said discriminator means; said integrator means, having an input and output, adapted to produce an output signal equivalent to the sum of said developed signals applied to the input thereof from said discriminator means during a sampling period; means for applying said derived signals to said integrator means and means for deriving a control signal from the output of said integrator means which varies in amplitude in accordance with the intensity of the radioactive radiations received by the detector means during a sampling period of predetermined duration.

10. A miss distance indicator system as set forth in claim 8 including discriminator means having an input and an output circuit adapted to selectively discriminate against signals developed by applied radiations below a predetermined energy level; means for feeding said developed signals to said discriminator means; means for developing reset pulses of predetermined recurrent rate; said integrator means having an input and output circuit for deriving signals in response to the output of said discriminator means; means for individually applying the discriminator output and reset pulses to the input of said integrator means for deriving a control signal from the output of said integrator means, the amplitude of which varies in accordance with the intensity of applied radioactive radiations received by the detection means during each sampling period occurring between reset pulses.

11. A miss distance indicator system for detecting the proximity of a missile to a target comprising: a substantially point source of radioactive radiations of known activity; detection means for developing electrical signals in response to applied radioactive radiations and in accordance with the intensity thereof; discriminator means adapted to selectively discriminate against signals developed by said detection means below a predetermined energy level; means for feeding said developed signals to said discriminator means; means for developing reset pulses of predetermined relatively short, discrete recurrent rate, integrator means having an input and output circuit, adapted to produce an output signal equivalent to the sum of said developed signals applied to the input thereof from said discriminator means during a sampling period; means for individually applying the discriminator output and said developed reset pulses to the input of said integrator, means for deriving from the output circuit of said integrator a control signal which varies in accordance with the intensity of the applied radioactive radiations received during each sampling period as determined by the time interval between reset pulses; means responsive to the amplitude of said control signal to indicate the proximity of the detector and the radioactive source and disabling means operative to disable the indicator system for a predetermined time interval after proximity has been indicated.

12. A miss distance indicator system according to claim 11, in which the amplitude responsive means includes a discriminator means which is responsive to signals equal to or greater than a predetermined amplitude, having an input and an output; means for applying said control signal to said input to develop an output voltage; a flip-flop circuit; means for applying the discriminator output voltage to an input of said flip-flop circuit to flop the same from one bistable condition to the other and develop an output, and a relay connected in said flip-flop circuit responsive to the actuation thereof serving to indicate a predetermined proximity of the detector means and radioactive source.

13. A miss distance indicator system as set forth in claim 11 wherein the disabling means includes generator means responsive to the output of the flip-flop to produce a disabling pulse; means for applying the flip-flop output to disabling generator means, and clamp means connected to the input of said integrator means responsive to the generated disabling pulse to clamp incoming signals and to disable the indicator system for the duration of the disabling pulse.

14. A miss distance indicator for detecting the proximity of a missile to a target comprising a substantially point source of radioactive radiations of known activity; detection means adapted to develop electrical signals in response to applied radioactive radiations and in accordance with the intensity thereof; discriminator means having an input and an output circuit for discriminating against signals developed by radiations below a predetermined energy level; means for applying said developed signals to the input of said discriminator; means for deriving signals from said output circuit; means for developing reset pulses of predetermined relatively short, discrete recurrent rate; integrator means having an input and an output circuit; means for individually applying the discriminator output and said reset pulses to the input of said integrator; means for deriving from the output circuit of said integrator a control signal, the amplitude of which varies in accordance with the intensity of the applied radioactive radiations received by the detection means during each sampling period occurring between reset pulses and means responsive to the amplitude of said control signal to indicate the proximity of the detector and the radioactive source.

15. A miss distance indicator for detecting the proximity of a missile to a target comprising a substantially point source of radioactive radiations of known activity, detection means adapted to develop electrical signals in response to applied radioactive radiations and in accordance with the intensity thereof; discriminator means having an input and output circuit for discriminating against signals developed by radiations below a predetermined energy level; means for applying said developed signals to the input of said discriminator; means for deriving signals from said output circuit; means for developing reset pulses of predetermined relatively short, discrete recurrent rate; integrator means having an input and output circuit; means for individually applying the discriminator output and said developed reset pulses to the input of said integrator; means for deriving from the output circuit of said integrator a control signal, the amplitude of which varies in accordance with the intensity of the applied radioactive radiations received by the detector means during each sampling period occurring between reset pulses; amplitude responsive means responsive to the amplitude of said control signal to develop a signal indicative of the proximity of the detector and the radiodactive source, and signal means responsive to said developed signal to present a physical manifestation of the proximity of the detector and the radioactive source.

16. A miss distance indicator system as set forth in claim 15 wherein the amplitude responsive means comprises a discriminator means, responsive to input signals equal to or greater than a predetermined amplitude, having an input and an output; means for applying said integrator output signal to said input; means for deriving an output voltage; a flip-flop circuit; means for applying said output voltage to said flip-flop circuit to flop same from one bistable condition to the other; a relay connected to said flip-flop and actuated by the action thereof; and signal means connected to said relay adapted to be energized thereby and present a physical manifestation of the proximity of the detector and the radioactive source.

17. A miss distance indicator for detecting the proximity of a missile to a target comprising a substantially point source of radioactive radiation of known intensity; detection means for developing electrical signals in response to applied radioactive radiations in accordance with the intensity thereof; discriminator means having an input and an output circuit adapted to discriminate against signals developed by radiations below a predetermined energy level; means for applying said developed signals to the input of said discriminator; means for developing reset pulses of predetermined relatively short, discrete recurrent rate; a first integrator means having an input and output circuit; means for deriving signals from the output of said discriminator means; means for individually applying the discriminator output and said reset pulses to said integrator input; a second integrator means, with input and output, having a relatively long time constant in comparison with the first integrator means and adapted to provide a long term integration of the discriminator output and develop a relatively steady state output voltage proportional to the background radiation intensity; means for applying the discriminator output to the second integrator input and means further applying the second integrator output to the input of said first integrator, the second integrator output being of opposing phase to that of the discriminator output whereby the input signals to the first integrator are reduced by an amount equivalent to the average random background radiation.

References Cited in the file of this patent

UNITED STATES PATENTS

| | | |
|---|---|---|
| 2,237,193 | Mobsby | Apr. 1, 1941 |
| 2,262,942 | Jones | Nov. 18, 1941 |
| 2,431,625 | Tolson | Nov. 25, 1947 |
| 2,557,949 | Deloraine | June 26, 1951 |
| 2,730,626 | Varney | Jan. 10, 1956 |
| 2,740,053 | Scherbatskoy | Mar. 27, 1956 |
| 2,750,583 | McCullough | June 12, 1956 |
| 2,763,789 | Ohmart | Sept. 18, 1956 |